(12) United States Patent
Suzuki et al.

(10) Patent No.: US 9,642,229 B2
(45) Date of Patent: *May 2, 2017

(54) LIGHT SOURCE APPARATUS, DISCHARGE LAMP DRIVING METHOD, AND PROJECTOR

(71) Applicant: Seiko Epson Corporation, Tokyo (JP)

(72) Inventors: Junichi Suzuki, Chino (JP); Satoshi Kito, Chino (JP)

(73) Assignee: Seiko Epson Corporation, Tokyo (JP)

( * ) Notice: Subject to any disclaimer, the term of this patent is extended or adjusted under 35 U.S.C. 154(b) by 143 days.

This patent is subject to a terminal disclaimer.

(21) Appl. No.: 14/257,427

(22) Filed: Apr. 21, 2014

(65) Prior Publication Data

US 2014/0226135 A1 Aug. 14, 2014

Related U.S. Application Data

(63) Continuation of application No. 13/478,536, filed on May 23, 2012, now Pat. No. 8,742,697.

(30) Foreign Application Priority Data

Jun. 15, 2011 (JP) .................. 2011-133456

(51) Int. Cl.
  *H05B 37/02* (2006.01)
  *H05B 41/36* (2006.01)
  (Continued)

(52) U.S. Cl.
  CPC .......... *H05B 41/36* (2013.01); *G03B 21/206* (2013.01); *G03B 21/2026* (2013.01); *H05B 41/2858* (2013.01)

(58) Field of Classification Search
  CPC . Y02B 20/204; Y10S 315/07; H05B 41/2883; H05B 41/2928; H05B 41/2858;
  (Continued)

(56) References Cited

U.S. PATENT DOCUMENTS 6,294,870 B1  9/2001  Kawashima et al.
6,552,501 B2  4/2003  Ito et al.
(Continued)

FOREIGN PATENT DOCUMENTS

CN  101959355 A  1/2011
JP  60-148084    8/1985
(Continued)

OTHER PUBLICATIONS

Notice of Allowance and Notice of Allowability received in U.S. Appl. No. 13/478,536; Jan. 21, 2014.

*Primary Examiner* — Vibol Tan
(74) *Attorney, Agent, or Firm* — ALG Intellectual Property, LLC (57) ABSTRACT

In at least one embodiment, a light source apparatus includes a discharge lamp with a pair of electrodes and a driving unit that supplies a driving current to the pair of electrodes. The driving unit includes an AC supplier that supplies an alternating current to the pair of electrodes and a DC supplier that supplies a direct current to the pair of electrodes. The AC supplier is configured to alternately repeat an AC supply section in which the alternating current is supplied and an AC stop section in which the supply of the alternating current is stopped. The DC supplier is configured to supply the direct current during a period corresponding to the AC stop section. A frequency of the direct current is not lower than 10 Hz and not higher than 1 kHz.

29 Claims, 8 Drawing Sheets

(51) Int. Cl.
*H05B 41/285* (2006.01)
*G03B 21/20* (2006.01)

(58) Field of Classification Search
CPC .. H05B 41/382; H05B 41/388; H05B 41/2851;
H05B 41/288; H05B 41/2926; G03B
21/2026; G03B 21/2053; G03B 21/14;
H01J 61/822; H01J 61/86
See application file for complete search history.

(56) References Cited

U.S. PATENT DOCUMENTS

| | | | |
|---|---|---|---|
| 6,891,336 B1 | 5/2005 | Mita | |
| 7,184,581 B2 | 2/2007 | Johansen et al. | |
| 7,999,488 B2 | 8/2011 | Okawa | |
| 8,183,796 B2* | 5/2012 | Terashima | H05B 41/2928 315/299 |
| 8,203,280 B2* | 6/2012 | Yamauchi | G03B 21/00 315/291 |
| 8,294,385 B2 | 10/2012 | Kumagai et al. | |
| 8,324,828 B2* | 12/2012 | Yamamoto | H05B 41/2888 315/209 R |
| 8,558,471 B2* | 10/2013 | Yamauchi | G03B 21/00 315/209 R |
| 8,884,543 B2* | 11/2014 | Suzuki | H05B 41/36 315/246 |
| 8,888,299 B2* | 11/2014 | Suzuki | G03B 21/14 353/85 |
| 9,030,111 B2* | 5/2015 | Imamura | H05B 41/2888 315/209 R |
| 9,146,451 B2* | 9/2015 | Suzuki | G03B 21/2026 |
| 2003/0080693 A1 | 5/2003 | Ono et al. | |
| 2010/0084987 A1* | 4/2010 | Yamauchi | H05B 41/38 315/224 |
| 2010/0127631 A1 | 5/2010 | Okamoto et al. | |
| 2011/0012524 A1 | 1/2011 | Terashima | |
| 2013/0342107 A1 | 12/2013 | Haacke et al. | |

FOREIGN PATENT DOCUMENTS

| | | |
|---|---|---|
| JP | 2003-133091 A | 5/2003 |
| JP | 2007-115534 A | 5/2007 |
| JP | 2009-026747 A | 2/2009 |
| JP | 2010-123478 A | 6/2010 |
| JP | 2010-251038 A | 11/2010 |
| JP | 2011-003486 A | 1/2011 |
| JP | 2011-023154 A | 2/2011 |

* cited by examiner

LIGHT SOURCE APPARATUS, DISCHARGE LAMP DRIVING METHOD, AND PROJECTOR

CROSS-REFERENCE

The present application is a continuation application of U.S. patent application Ser. No. 13/478,536 filed on May 23, 2012 which claims priority from Japanese Patent Application No. 2011-133456 filed on Jun. 15, 2011 which are hereby expressly incorporated by reference in their entirety.

BACKGROUND

1. Technical Field

The present invention relates to a light source apparatus, a driving method of a discharge lamp, and a projector.

2. Related Art

Discharge lamps such as a high-pressure mercury lamp and a metal halide lamp are currently employed as a light source of a projector.

Such discharge lamps are driven by supplying, for example, a high-frequency alternating current as the driving current. Such a driving method provides stabilized discharge performance and prevents blackening or devitrification of the discharge lamp main portion thereby suppressing degradation of the life span of the discharge lamp.

However, while the discharge lamp is turned on arc discharge takes place between a pair of electrodes, and the electrodes melt because of a high temperature and thus the clearance between the electrodes become wider. In the case where the discharge lamp is employed for a projector, it is preferable to maintain a narrow clearance between the electrodes so as to illuminate a smaller region, in order to achieve a higher utilization efficiency of the light, and the increase of the clearance between the electrodes is not desirable since it leads to lower utilization efficiency of the light. The increase of the clearance between the electrodes also incurs fluctuation of the impedance therebetween, and therefore although the discharge lamp provides high efficiency during an initial period of use, impedance mismatch occurs with the lapse of time, which leads to an increase in reactive power and degradation of efficiency.

On the other hand, a low-frequency alternating current that presents a rectangular waveform (square AC) is also employed as the driving current. With such a driving method, a projection is formed on each of the pair of electrodes with the use of the discharge lamp, which contributes to maintain the narrow clearance between the electrodes.

In this case, however, the discharge lamp main portion is prone to suffer blackening and devitrification, resulting in reduced life span of the discharge lamp.

JP-A-2007-115534 is an example of related art.

SUMMARY

An advantage of some aspects of the invention is the provision of a light source apparatus and a driving method of a discharge lamp capable of suppressing blackening of the discharge lamp and maintaining a constant clearance between the electrodes of the discharge lamp, and a projector that utilizes the light source apparatus and the driving method.

In an aspect, the invention provides a light source apparatus including a discharge lamp that includes a light-emitting container having a cavity in which a discharge medium is enclosed and a pair of electrodes disposed such that respective tip portions thereof oppose each other in the cavity; and a driving unit that supplies a driving current to the pair of electrodes. The driving unit includes an AC supplier that supplies an alternating current of a frequency not lower than 1 kHz and not higher than 10 GHz to the pair of electrodes and a DC supplier that supplies a direct current to the pair of electrodes. The AC supplier is configured so as to alternately repeat an AC supply section in which the alternating current is supplied and an AC stop section in which the supply of the alternating current is stopped. The DC supplier is configured so as to supply the direct current during a period corresponding to the AC stop section.

With the foregoing configuration, the blackening of the discharge lamp can be suppressed and the clearance between the electrodes can be maintained constant, while the discharge lamp is driven.

Preferably, the direction of the direct current may be changed at least once while the direct current is supplied to the light source apparatus.

Such an arrangement assures growth of a projection on the electrodes.

Preferably, the direct current may be supplied during the entire period corresponding to the AC stop section.

Such an arrangement further assures the growth of the projection on the electrodes.

Preferably, the AC stop section may include a period in which the supply of the direct current is also stopped.

Such an arrangement is useful, for example when it is preferable to slightly suppress the growth of the projection.

Preferably, a magnitude of the direct current may be maintained constant while the direct current is supplied.

Such an arrangement further assures the growth of the projection on the electrodes.

Preferably, an average magnitude of the alternating current in the AC supply section may be the same as the magnitude of the direct current supplied in the period corresponding to the AC stop section.

Such an arrangement further assures the growth of the projection on the electrodes.

Preferably, a ratio B/A may be not lower than 50% and not higher than 99%, where A represents a total of the periods corresponding to the AC supply section and the AC stop section, and B represents the period corresponding to the AC supply section.

Such an arrangement further assures the growth of the projection on the electrodes.

Preferably, the magnitude of the alternating current may be maintained constant in the AC supply section.

Such an arrangement further assures the growth of the projection on the electrodes.

Preferably, the magnitude of the alternating current may be set to gradually vary in the AC supply section.

Such an arrangement further assures the growth of the projection on the electrodes.

Preferably, the frequency of the alternating current may be not lower than 1 kHz and not higher than 100 kHz, or not lower than 3 MHz and not higher than 10 GHz.

Such an arrangement prevents the discharge performance from becoming unstable because of acoustic resonance.

Preferably, a projection may be formed on a tip portion of each of the pair of electrodes while the discharge lamp is turned on, because of fluctuation of temperature of the pair of electrodes.

With such an arrangement, the clearance between the electrodes can be maintained constant, so that the discharge lamp can be efficiently driven.

In another aspect, the invention provides a driving method of a discharge lamp including a light-emitting container having a cavity in which a discharge medium is enclosed and a pair of electrodes disposed such that respective tip portions thereof oppose each other in the cavity. The method includes generating an alternating current of a frequency not lower than 1 kHz and not higher than 10 GHz and a direct current; generating a driving current by alternately repeating an AC supply section in which the alternating current is supplied and an AC stop section in which the supply of the alternating current is stopped and supplying the direct current during a period corresponding to the AC stop section; and supplying the driving current to the pair of electrodes.

With the foregoing method, the blackening of the discharge lamp can be suppressed and the clearance between the electrodes can be maintained constant, while the discharge lamp is driven.

In still another aspect, the invention provides a projector including a light source apparatus that emits a light; a modulation unit that modulates the light emitted from the light source apparatus on the basis of image data; and a projecting unit that projects the light modulated by the modulation unit. The light source apparatus includes a discharge lamp including a light-emitting container having a cavity in which a discharge medium is enclosed and a pair of electrodes disposed such that respective tip portions thereof oppose each other in the cavity, and a driving unit that supplies a driving current to the pair of electrodes. The driving unit includes an AC supplier that supplies an alternating current of a frequency not lower than 1 kHz and not higher than 10 GHz to the pair of electrodes and a DC supplier that supplies a direct current to the pair of electrodes. The AC supplier is configured so as to alternately repeat an AC supply section in which the alternating current is supplied and an AC stop section in which the supply of the alternating current is stopped, and the DC supplier is configured so as to supply the direct current during a period corresponding to the AC stop section.

With the foregoing configuration, the blackening of the discharge lamp can be suppressed and the clearance between the electrodes can be maintained constant, while the discharge lamp is driven.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, preferred embodiments of a light source apparatus, a driving method of a discharge lamp, and a projector will be described referring to the drawings.

First Embodiment

Figure 1:
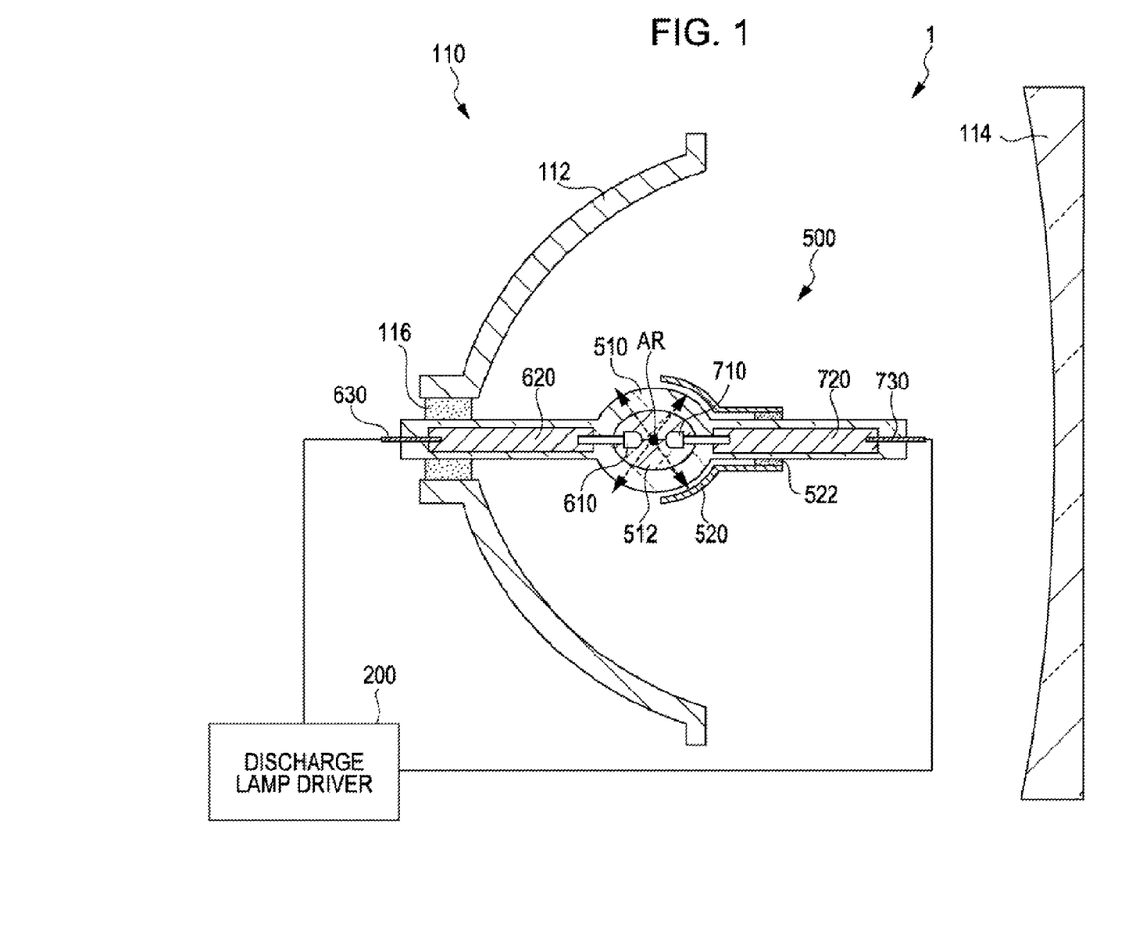
FIG. 1 is a cross-sectional view, partially illustrated as a block diagram, showing a light source apparatus according to a first embodiment of the invention.
Figure 2:
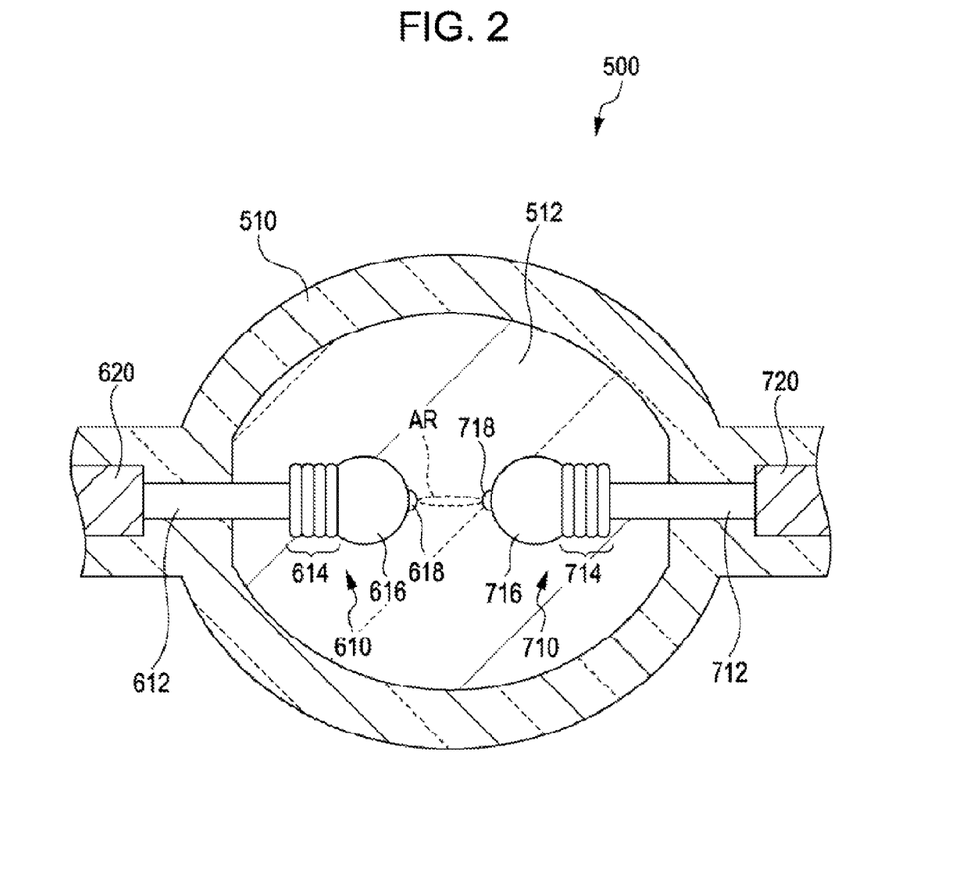
FIG. 2 is an enlarged cross-sectional view of the discharge lamp of the light source apparatus shown in FIG. 1.
Figure 3:
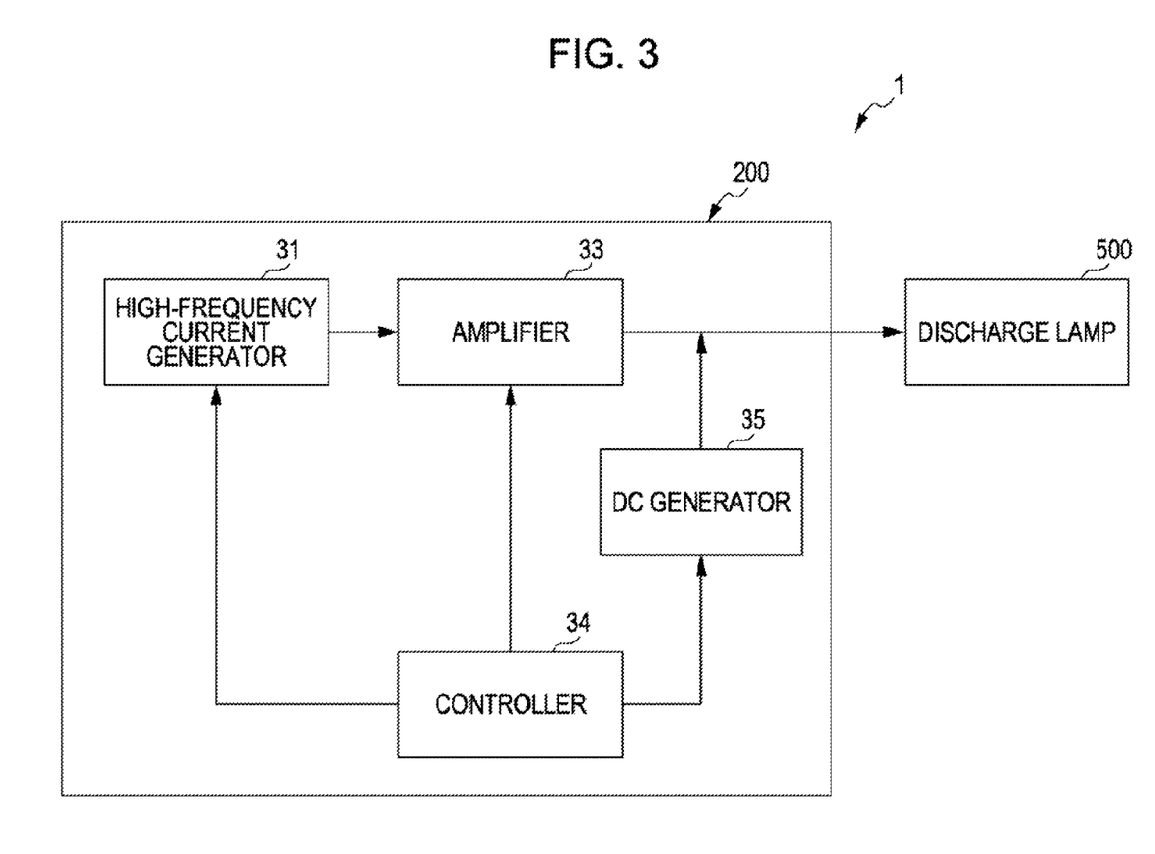
FIG. 3 is a block diagram showing a configuration of a discharge lamp driver of the light source apparatus shown in FIG. 1.
Figure 4:
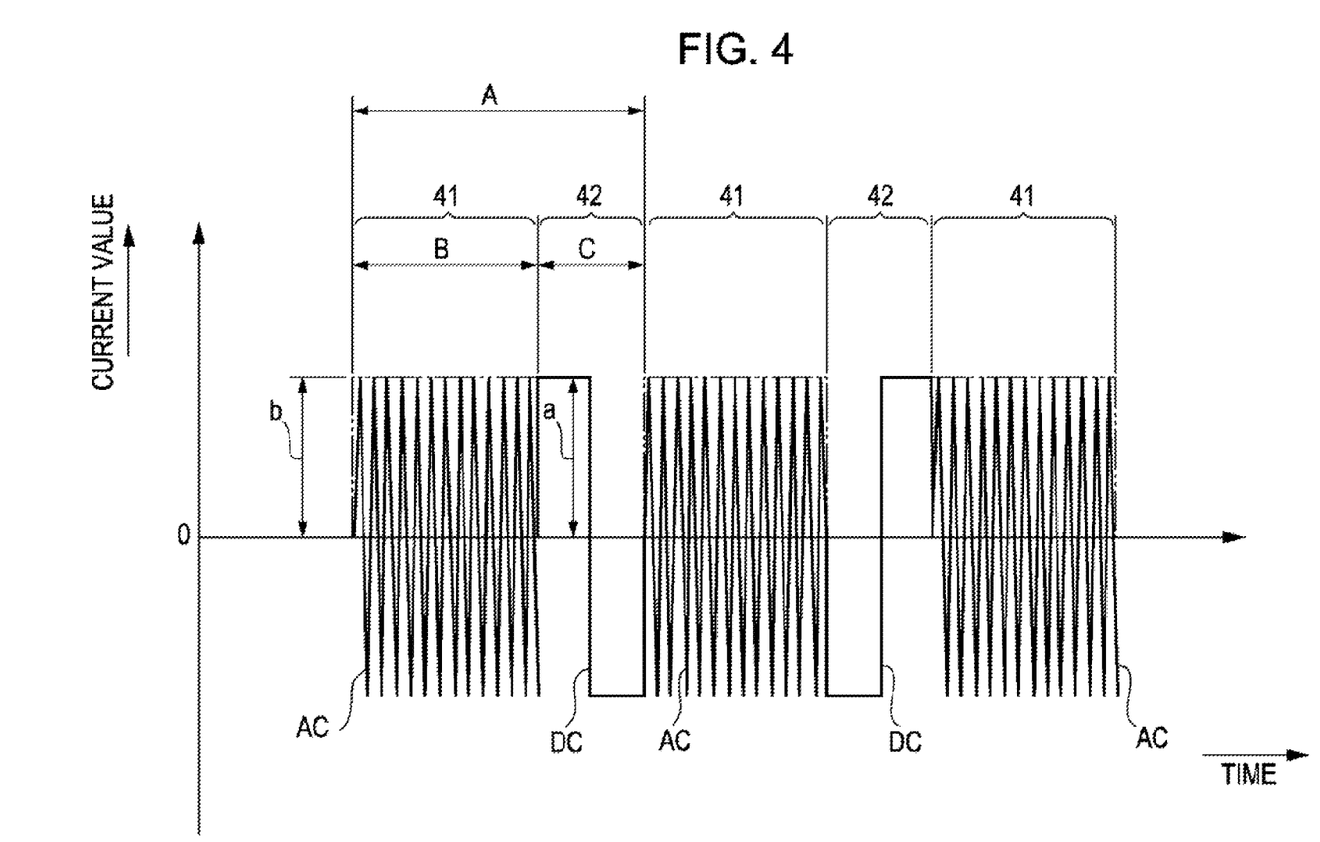
FIG. 4 is a time chart showing a current generated by the discharge lamp driver of the light source apparatus shown in FIG. 1.

FIG. 1 is a cross-sectional view with a partial block diagram, showing a light source apparatus according to a first embodiment of the invention. FIG. 2 is an enlarged cross-sectional view of the discharge lamp of the light source apparatus shown in FIG. 1. FIG. 3 is a block diagram showing a configuration of a discharge lamp driver of the light source apparatus shown in FIG. 1. FIG. 4 is a time chart showing a current generated by the discharge lamp driver of the light source apparatus shown in FIG. 1. In FIG. 2, a sub reflection mirror shown in FIG. 1 is excluded. In FIG. 4, dash-dot-dot lines represent an "envelope", which also applies to FIGS. 5 to 7.

As shown in FIG. 1, the light source apparatus 1 includes a light source unit 110 having a discharge lamp 500, and a discharge lamp driver 200 (driving unit) that drives the discharge lamp 500. The discharge lamp 500 performs discharge upon receipt of power supplied by the discharge lamp driver 200, so as to emit a light.

The light source unit 110 includes a discharge lamp 500, a main reflection mirror 112 having a concave reflecting surface, and a parallelizing lens 114 that converts the emitted light into a generally parallel light. The main reflection mirror 112 and the discharge lamp 500 are coupled via an inorganic adhesive 116. The surface of the main reflection mirror 112 on the side of the discharge lamp 500 (inner surface) is formed as a reflecting surface which, according to FIG. 1, has a spheroidal shape.

The shape of the reflecting surface of the main reflection mirror 112 is not limited to the spheroid but may be a different shape such as a paraboloid of revolution. In the case where the reflecting surface of the main reflection mirror 112 is formed in the paraboloid of revolution, placing the light emitting position of the discharge lamp 500 at the focal point of the paraboloid of revolution allows the parallelizing lens 114 to be excluded.

The discharge lamp 500 includes a discharge lamp main unit 510 and a sub reflection mirror 520 having a concave reflecting surface. The discharge lamp main unit 510 and the sub reflection mirror 520 are coupled via an inorganic adhesive 522. The surface of the sub reflection mirror 520 on the side of the discharge lamp 500 (inner surface) is formed as a reflecting surface which, according to FIG. 1, constitutes a spherical surface.

A discharge medium to be subsequently described is enclosed in a central portion of the discharge lamp main unit 510, and thus a light-emitting container including an airtightly closed discharge chamber 512 (cavity) is formed. At least a portion of the discharge lamp main unit 510 facing the discharge chamber 512 is light-transmissive. Examples of the material of the discharge lamp main unit 510 include a glass such as quartz glass, and a light-transmissive ceramic.

The discharge lamp main unit 510 includes a pair of electrodes 610, 710, a pair of conductive connectors 620, 720, and a pair of electrode terminals 630, 730. The connector 620 electrically connects the electrode 610 and the electrode terminal 630. Likewise, the connector 720 electrically connects the electrode 710 and the electrode terminal 730.

The electrodes 610, 710 are accommodated in the discharge chamber 512. More specifically, the electrodes 610, 710 are disposed such that the respective tip portions oppose each other with a predetermined clearance therebetween, in the discharge chamber 512 of the discharge lamp main unit 510.

It is preferable that the clearance between the electrodes, i.e., a shortest distance between the electrode 610 and the electrode 710, be not shorter than 1 μm and not longer than 5 mm, and more preferably not shorter than 500 μm and not longer than 1.5 mm.

As shown in FIG. 2, the electrode 610 includes a core 612, a coil portion 614, and a main body 616. Before being mounted in the discharge lamp main unit 510, the electrode 610 is formed through winding an electrode material (tungsten or the like) on the core 612 so as to form the coil portion 614, and hot-melting the coil portion 614. Through such a process, the main body 616 at the tip portion of the electrode 610 acquires a large thermal capacity. Likewise the electrode 710 includes a core 712, a coil portion 714, and a main body 716, and is formed through the same process as the electrode 610.

Projections 618, 718 are not present on the main bodies 616, 716 before the discharge lamp 500 is first turned on, however when the discharge lamp 500 is turned on even once under a subsequently described condition, the projections 618, 718 are formed on the tip portion of the main bodies 616, 716, respectively. The projections 618, 718 are maintained while the discharge lamp 500 is lit, and also remain after the discharge lamp 500 is turned off.

Examples of the material of the electrodes 610, 710 include a metal having a high melting point, such as tungsten.

A discharge medium is enclosed in the discharge chamber 512. The discharge medium contains, for example, a gas for starting the discharge and a gas that contributes to light emission. Naturally, the discharge medium may contain other types of gas.

Examples of the gas for starting the discharge include noble gases such as neon, argon, and xenon. Examples of the gas that contributes to light emission include vapor of mercury, metal halide, and the like. Other types of gas can be exemplified by those that serve to suppress blackening. More specifically, examples of the gas that suppresses the blackening include halogens such as bromine, halogen compounds such as hydrogen bromide, and the vapor thereof.

It is preferable that the pressure in the discharge lamp main unit 510 when the discharge lamp is turned on be not lower than 0.1 atm and not higher than 300 atm, and more preferably not lower than 50 atm and not higher than 300 atm.

The electrode terminals 630, 730 of the discharge lamp 500 are each connected to an output terminal of the discharge lamp driver 200. The discharge lamp driver 200 serves to supply a driving current including an alternating current AC and a direct current DC, to the discharge lamp 500. Supplying the direct current a plurality of times alternately is also included in the supply of the direct current DC. In other words, the discharge lamp driver 200 supplies the alternating current AC and the direct current DC (hereinafter, the driving current that encompasses the alternating current AC and the direct current DC may be simply referred to as "current", where appropriate) to the electrodes 610, 710 through the electrode terminals 630, 730, thus supplying power to the discharge lamp 500. When the current is supplied to the electrodes 610, 710, arc discharge (arc AR) takes place between the tip portions of the pair of electrodes 610, 710 in the discharge chamber 512. The light generated by the arc discharge (discharge light) is emitted in all directions from the position where the arc AR has taken place (discharge position). The sub reflection mirror 520 reflects the light emitted in the direction of one of the electrodes 710 toward the main reflection mirror 112. Reflecting thus the light emitted in the direction of the electrodes 710 toward the main reflection mirror 112 allows the light emitted in the direction of the electrodes 710 to be efficiently utilized. Although the discharge lamp 500 includes the sub reflection mirror 520 in this embodiment, the sub reflection mirror 520 may be excluded from the discharge lamp 500.

The discharge lamp driver 200 will now be described.

As shown in FIG. 3, the discharge lamp driver 200 includes a high-frequency current generator 31 (AC supplier) that generates the alternating current AC of a high frequency, an amplifier 33, a DC generator 35 (DC supplier) that generates the direct current DC, and a controller 34 constituted of for example a central processing unit (CPU) and configured so as to control the respective operation of the high-frequency current generator 31, the amplifier 33, and the DC generator 35. Thus, the controller 34 serves to supply the alternating current AC and the direct current DC to the pair of electrodes 610, 710 of the discharge lamp 500, as the driving current.

The discharge lamp driver 200 amplifies the alternating current AC generated by the high-frequency current generator 31 with the amplifier 33, to thereby generate and output the alternating current AC that serves as the driving current for the discharge lamp. In this process, the discharge lamp driver 200 causes the controller 34 to switch on and off the amplifier 33 thereby alternately repeating, as shown in FIG. 4, an AC supply section 41 in which the alternating current AC is continuously supplied and an AC stop section 42 in which the supply of the alternating current AC is stopped. Accordingly, the discharge lamp driver 200 intermittently supplies the alternating current AC to the pair of electrodes 610, 710 of the discharge lamp 500. In addition, the discharge lamp driver 200 outputs, during the period corresponding to the AC stop section 42 while intermittently supplying the alternating current AC, in other words while alternately repeating the AC supply section 41 and the AC stop section 42, the direct current DC generated by the DC generator 35 as the driving current for the discharge lamp. The timing to supply the direct current DC is controlled by the controller 34 which switches on and off the DC generator 35. Upon supplying thus the alternating current AC and the direct current DC, the arc discharge takes place between the tip portions of the pair of electrodes 610, 710 so that the discharge lamp is turned on, as described above.

In the light source apparatus 1, the discharge lamp 500 is turned on by the driving current of subsequently described conditions, so that the temperature of the electrodes 610, 710 fluctuates while the discharge lamp 500 is turned on, and the projections 618, 718 are formed on the tip portions of the electrodes 610, 710 and maintained thereon, by such temperature fluctuation.

More specifically, in the AC supply section 41 a part of the tip portions of the electrodes 610, 710 melts because of an increase in temperature, and the molten electrode material concentrates at the tip portions of the electrodes 610, 710 owing to surface tension. In the AC stop section 42, since the supply of the driving current is stopped, the temperature of the electrodes 610, 710 falls from the level of the AC supply section 41, and hence the molten electrode material coagulates. Thus, the projections 618, 718 grow because of the repetition of the concentration of the molten electrode material at the tip portions of the electrodes 610, 710 and the coagulation of the molten electrode material. In this process, supplying the direct current DC during the period corresponding to the AC stop section 42 as stated above encourages the growth (formation) of the projections 618, 718, compared with the case where the direct current DC is not supplied. Such an arrangement assures that the projections 618, 718 are effectively formed, and therefore the clearance between the electrodes can be maintained constant. In the light source apparatus 1 thus configured, the discharge lamp 500 can be efficiently driven.

In addition, since both the high frequency alternating current AC and the direct current DC are employed, the blackening of the discharge lamp 500 can be suppressed, which contributes to extending the life span of the discharge lamp 500.

The rated power of the discharge lamp 500 is not specifically limited and may be appropriately determined depending on the purpose and other factors, however a preferable range is between 10 W and 5 kW, and more preferably between 100 W and 500 W.

A preferable range of the frequency of the alternating current AC is broadly between 1 kHz and 10 GHz, but it is preferable that the frequency be between 1 kHz and 100 kHz or between 3 MHz and 10 GHz, and more preferably between 1 kHz and 20 kHz or between 3 MHz and 3 GHz.

Although the electrode temperature becomes higher when the electrodes 610, 710 act as an anode compared with the case of acting as a cathode, setting the frequency of the alternating current AC at a level not lower than the lower limit prevents the fluctuation of the electrode temperature during the relevant cycle of the alternating current AC.

However, in the case where the frequency of the alternating current AC is lower than the lower limit, the temperature of the electrodes 610, 710 fluctuates at every cycle of the alternating current AC, which disables the projections 618, 718 from being formed or maintained, and may lead to blackening. Conversely, setting the frequency at a level higher than the upper limit results in an increase in cost.

In the case where the frequency of the alternating current AC is between 100 kHz and 3 MHz, the discharge performance may become unstable because of acoustic resonance, depending on other conditions.

As already stated, the discharge lamp driver 200 alternately repeats the AC supply section 41 in which the alternating current AC is continuously supplied and the AC stop section 42 in which the supply of the alternating current AC is stopped.

In this repetition, a ratio between A and B (B/A), where A represents the total of the periods corresponding to the AC supply section 41 and the AC stop section 42 and B represents the period corresponding to the AC supply section 41, is not specifically limited but may be differently set depending on conditions. However, it is preferable that the ratio B/A be not lower than 50% and not higher than 99%, in other words it is preferable that the period B corresponding to the AC supply section 41 be longer than a period C corresponding to the AC stop section 42 (=period A−period B). More particularly, it is preferable that the ratio B/A be higher than 50% but not higher than 75%.

More specifically, it is preferable that the period A corresponding to the AC supply section 41 be between 1 msec and 100 msec, and more preferably between 2 msec and 20 msec. On the other hand, it is preferable that the period C corresponding to the AC stop section 42 be between 10 vec and 100 msec, and more preferably between 50 vec and 20 msec.

In the case where the ratio B/A is smaller than the lower limit, the discharge lamp 500 becomes more prone to suffer blackening owing to fluctuation of the electrode temperature, depending on other conditions. Conversely, in the case where the ratio B/A is greater than the upper limit, the projections 618, 718 may fail to be formed, depending on other conditions.

In this embodiment, the amplitude of the alternating current AC is set to be constant in the AC supply section 41. Such an arrangement further assures the prevention of the blackening of the discharge lamp 500.

In addition, as shown in FIG. 4, the DC generator 35 changes the direction of the direct current DC once while supplying the direct current DC during the period corresponding to the AC stop section 42, in other words inverts the polarity once during the period. Accordingly, it may be construed that in the light source apparatus 1 a "square AC" is supplied to the discharge lamp 500.

It is preferable that the cycle of the polarity inversion of the direct current DC be longer than the cycle of the alternating current AC, for example between 10 Hz and 1000 Hz, and more preferably between 50 Hz and 500 Hz.

Such a setting of the cycle assures that the formation of the projections 618, 718 is effectively encouraged.

Although the polarity inversion of the direct current DC is performed once in the period in the setting shown in FIG. 4, the polarity inversion may be performed twice or more.

Further, the direct current DC is supplied during the entire period corresponding to the AC stop section 42. Such an arrangement further assures the formation of the projections 618, 718.

It is preferable that the magnitude (current magnitude "a") of the supplied direct current DC be constant, and the same as the average magnitude (amplitude) "b" of the alternating current AC of the AC supply section 41. Such a setting further assures the formation of the projections 618, 718. In addition, sharp fluctuation of the temperature is suppressed, and hence blackening can be prevented.

As described thus far, with the light source apparatus 1 the discharge lamp 500 can be exempted from blackening and the life span thereof can be prolonged. In addition, since the projections 618, 718 are formed on the electrodes 610, 710, the clearance between the electrodes can be maintained constant and the discharge lamp 500 can be efficiently driven.

Second Embodiment

Figure 5:
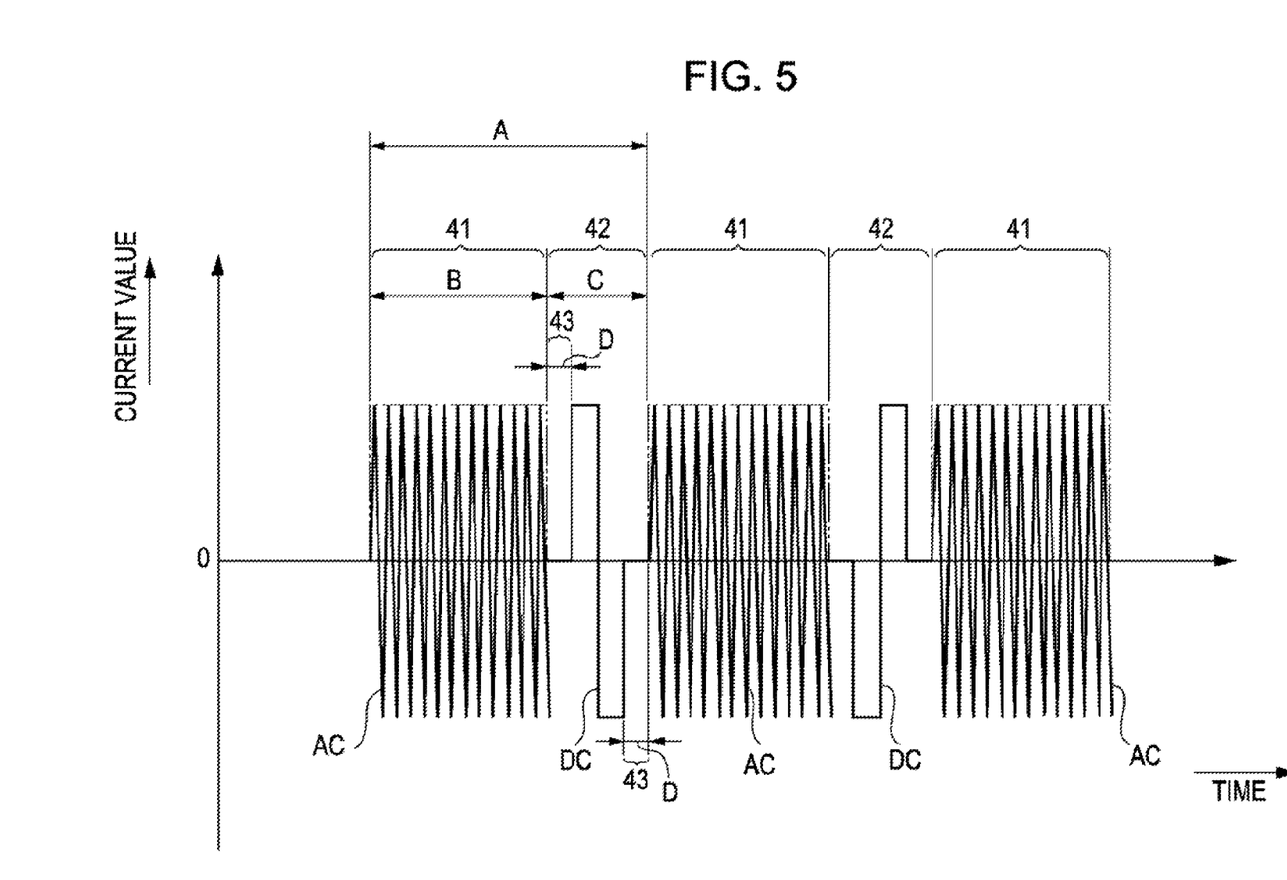
FIG. 5 is a time chart showing a current generated by a discharge lamp driver of a light source apparatus according to a second embodiment.

FIG. 5 is a time chart showing a current generated by a discharge lamp driver of a light source apparatus according to a second embodiment of the invention.

Referring to FIG. 5, the light source apparatus, the driving method of the discharge lamp, and the projector according to the second embodiment will be described here below, in which differences from the foregoing embodiment will be primarily focused on, and the description of like features will not be repeated.

This embodiment is generally the same as the first embodiment, except that the setting of the current supplied by the discharge lamp driver is different.

As shown in FIG. 5, the period corresponding to the AC stop section 42 includes a DC stop period 43 in which the supply of the direct current DC is also stopped. The DC stop period 43 is located immediately after the AC supply section 41, and immediately before the next AC supply section 41. It is preferable that a period D of the respective DC stop periods 43 be between 1% and 99% of the period C corresponding to the AC stop section 42, and more preferably between 10% and 50%.

Providing the DC stop period 43 as specified above is useful, for example when it is preferable to slightly suppress the growth of the projections 618, 718.

Third Embodiment

Figure 6:
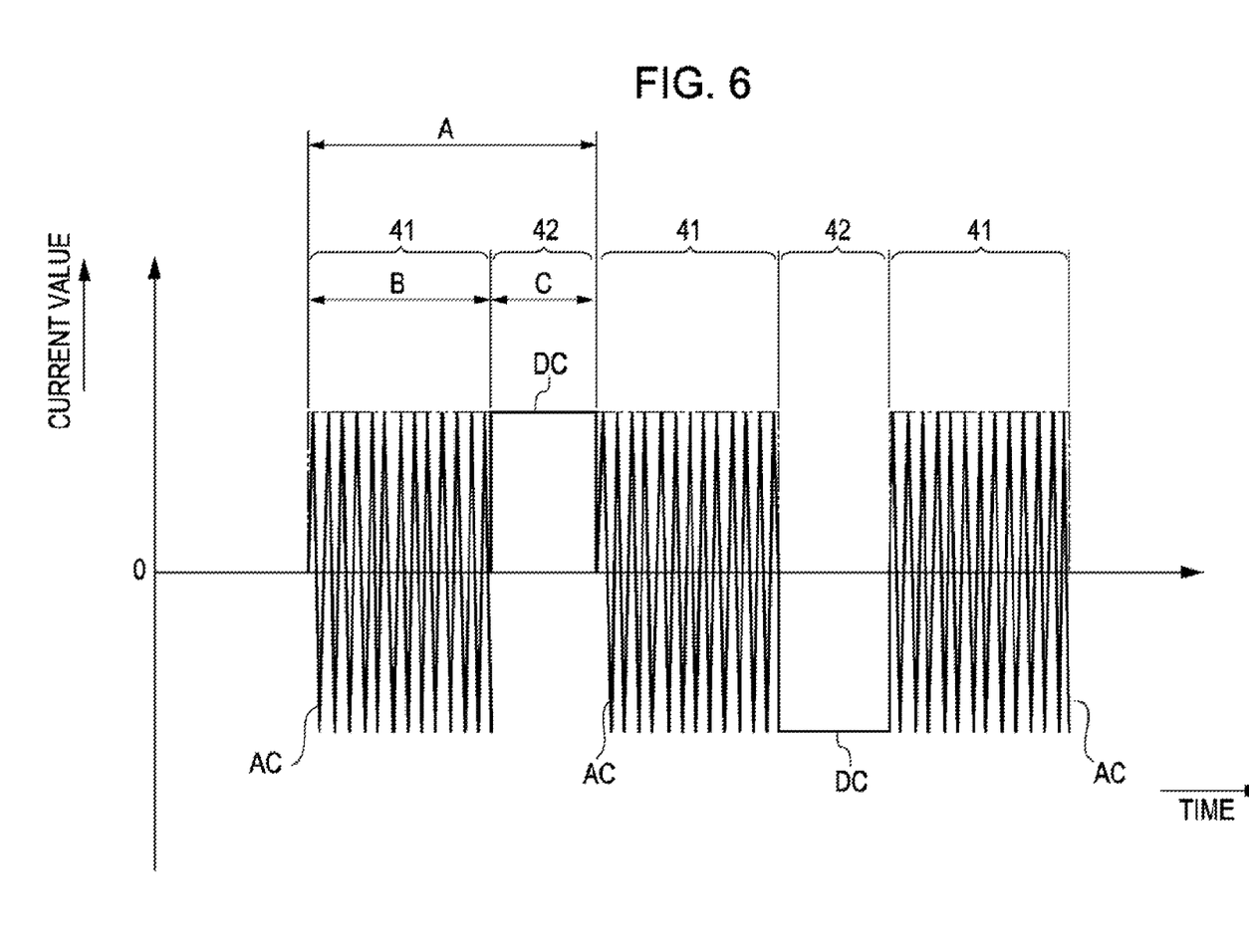
FIG. 6 is a time chart showing a current generated by a discharge lamp driver of a light source apparatus according to a third embodiment.

FIG. 6 is a time chart showing a current generated by a discharge lamp driver of a light source apparatus according to a third embodiment of the invention.

Referring to FIG. 6, the light source apparatus, the driving method of the discharge lamp, and the projector according to the third embodiment will be described here below, in which differences from the foregoing embodiments will be primarily focused on, and the description of like features will not be repeated.

This embodiment is generally the same as the first embodiment except that the setting of the current supplied by the discharge lamp driver is different.

As shown in FIG. 6, although the direct current DC is supplied during the entire period corresponding to the AC stop section 42, the direction of the direct current DC is not inverted, unlike in the first embodiment. Such a setting simplifies the operation of the DC generator 35 compared with the case of inverting the direction of the direct current DC.

Fourth Embodiment

Figure 7:
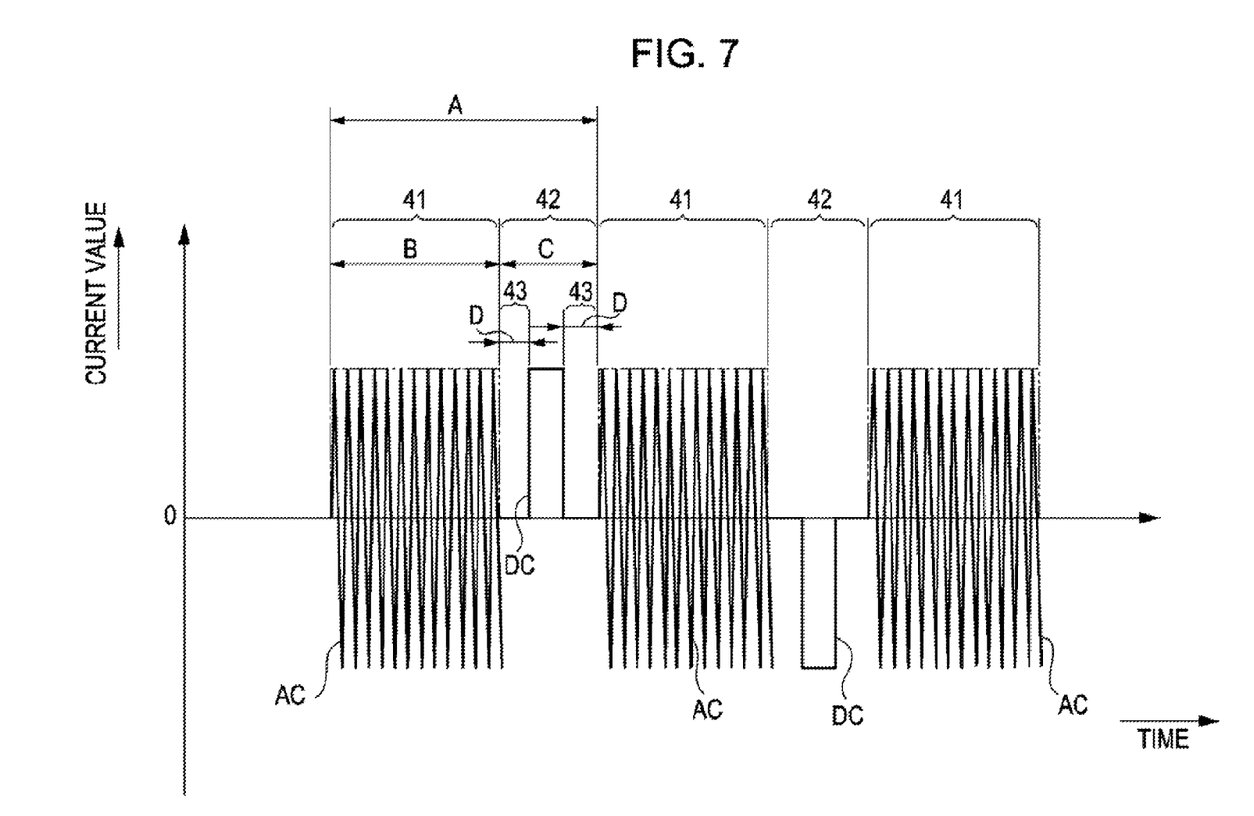
FIG. 7 is a time chart showing a current generated by a discharge lamp driver of a light source apparatus according to a fourth embodiment.

FIG. 7 is a time chart showing a current generated by a discharge lamp driver of a light source apparatus according to a fourth embodiment of the invention.

Referring to FIG. 7, the light source apparatus, the driving method of the discharge lamp, and the projector according to the fourth embodiment will be described here below, in which differences from the foregoing embodiments will be primarily focused on, and the description of like features will not be repeated.

This embodiment is generally the same as the third embodiment except that the setting of the current supplied by the discharge lamp driver is different.

As shown in FIG. 7, although the direction of the direct current DC is kept unchanged as in the third embodiment, the DC stop period 43 is included in the period corresponding to the AC stop section 42. The DC stop period 43 is located immediately after the AC supply section 41, and immediately before the next AC supply section 41.

Such a setting simplifies the operation of the DC generator 35, and slightly suppresses the growth of the projections 618, 718.

Projector

Figure 8:
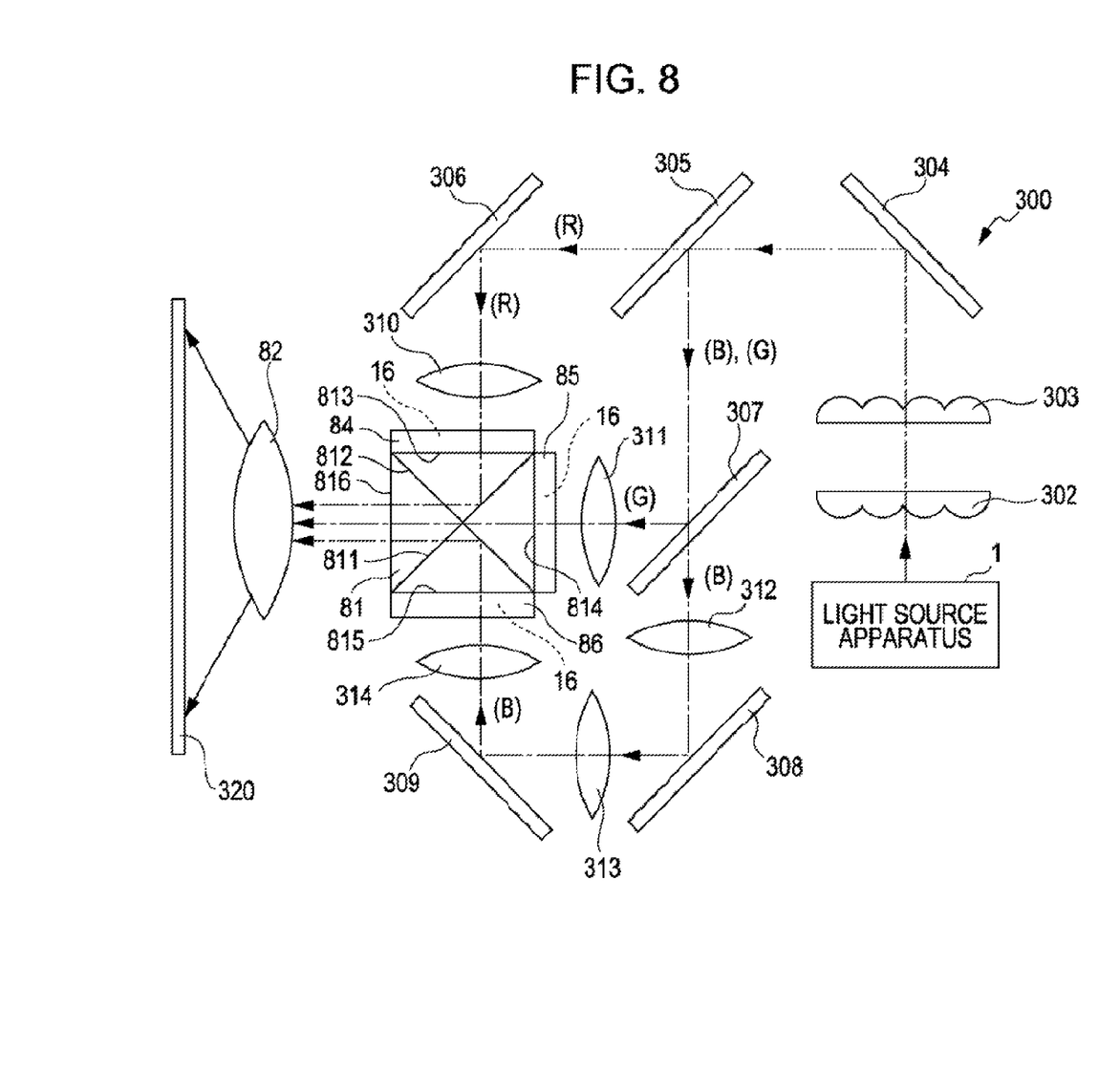
FIG. 8 is a schematic diagram showing a configuration of a projector according to an embodiment of the invention.

FIG. 8 is a schematic diagram showing a configuration of a projector according to an embodiment of the invention.

The projector 300 shown in FIG. 8 includes the aforementioned light source apparatus 1, an illumination optical system including integrator lenses 302, 303, a color separation optical system (light guide optical system), a liquid crystal light bulb 84 for red color, a liquid crystal light bulb 85 for green color, a liquid crystal light bulb 86 for blue color, a dichroic prism (color synthesis optical system) 81 including a dichroic mirror surface 811 that only reflects a red light and a dichroic mirror surface 812 that only reflects a blue light, and a projection lens (projection optical system) 82.

The color separation optical system includes mirrors 304, 306, and 309, a dichroic mirror 305 that reflects a blue light and a green light (transmits only a red light), a dichroic mirror 307 that only reflects a green light, a dichroic mirror 308 that only reflects a blue light, condenser lenses 310, 311, 312, 313, and 314.

The liquid crystal light bulb 85 includes an LCD panel 16, a first polarizing plate (not shown) attached to the light-receiving surface of the LCD panel 16, and a second polarizing plate (not shown) attached to the light-emitting surface of the LCD panel 16. The liquid crystal light bulbs 84 and 86 are also configured similarly to the liquid crystal light bulb 85. The respective LCD panels 16 of the liquid crystal light bulbs 84, 85, and 86 are connected to a driving circuit (not shown).

In the projector 300, the liquid crystal light bulbs 84, 85, and 86 and the driving circuit constitute the essential portion of a modulation unit that modulates the light emitted from the light source apparatus 1 on the basis of image data, and the projection lens 82 constitutes the essential portion of a projection unit that projects the light modulated by the modulation unit.

The thus-configured projector 300 operates as follows.

First, a white light (white light flux) emitted from the light source apparatus 1 passes through the integrator lenses 302, 303. The intensity (luminance distribution) of the white light is homogenized by the integrator lenses 302, 303.

After passing through the integrator lenses 302, 303, the white light is reflected by the mirror 304 to the left in FIG. 8. Out of the reflected light, blue light (B) and green light (G) are reflected downward in FIG. 8 by the dichroic mirror 305, and red light (R) passes through the dichroic mirror 305.

After passing through the dichroic mirror 305, the red light is reflected downward in FIG. 8 by the mirror 306, and such reflected light is shaped by the condenser lens 310 and enters the liquid crystal light bulb 84 for red color.

Out of the blue light and the green light reflected by the dichroic mirror 305, the green light is reflected by the dichroic mirror 307 to the left in FIG. 8, while the blue light passes through the dichroic mirror 307.

The green light reflected by the dichroic mirror 307 is shaped by the condenser lens 311 and enters the liquid crystal light bulb 85 for green color.

After passing through the dichroic mirror 307, the blue light is reflected by the dichroic mirror 308 to the left in FIG. 8, and such reflected light is reflected upward in FIG. 8 by the mirror 309. The blue light is then shaped by the condenser lenses 312, 313, and 314, and enters the liquid crystal light bulb 86 for blue color.

As described above, the white light emitted from the light source apparatus 1 is separated into the three primary colors of red, green, and blue by the color separation optical system, and each of the primary colors is guided to the corresponding liquid crystal light bulb 84, 85, and 86, thus to be incident thereon.

The pixels of the LCD panel 16 of the liquid crystal light bulb 84 are switched on and off under the control of the driving circuit operating on the basis of image signals corresponding to the red color. Likewise, the pixels of the LCD panel 16 of the liquid crystal light bulb 85 are switched on and off under the control of the driving circuit operating on the basis of image signals corresponding to the green color, and the pixels of the LCD panel 16 of the liquid crystal light bulb 86 are switched on and off under the control of the driving circuit operating on the basis of image signals corresponding to the blue color.

Thus, the red light, the green light, and the blue light are respectively modulated by the liquid crystal light bulbs 84, 85, and 86, so as to form the images each corresponding to the red color, the green color, and the blue color.

The image corresponding to the red color formed by the liquid crystal light bulb 84, in other words the red light from the liquid crystal light bulb 84 enters the dichroic prism 81 through an incident surface 813; is reflected to the left in FIG. 8 by the dichroic mirror surface 811; passes through the dichroic mirror surface 812; and is emitted through an output surface 816.

Likewise, the image corresponding to the green color formed by the liquid crystal light bulb 85, in other words the green light from the liquid crystal light bulb 85 enters the dichroic prism 81 through an incident surface 814; passes through the dichroic mirror surfaces 811, 812; and is emitted through the output surface 816.

Further, the image corresponding to the blue color formed by the liquid crystal light bulb 86, in other words the blue light from the liquid crystal light bulb 86 enters the dichroic prism 81 through an incident surface 815; is reflected to the left in FIG. 8 by the dichroic mirror surface 812; passes through the dichroic mirror surface 811; and is emitted through the output surface 816.

The lights of the respective colors outputted from the liquid crystal light bulbs 84, 85, and 86, in other words the respective images formed by the liquid crystal light bulbs 84, 85, and 86 are synthesized by the dichroic prism 81, so as to constitute a color image. This image is projected (extended projection) by the projection lens 82 onto a screen 320 placed at a predetermined position.

As described thus far, since the projector 300 includes the aforementioned light source apparatus 1, the projector 300 can display stable and high-quality images with reduced power consumption.

Although the embodiments of the light source apparatus, the driving method of discharge lamp and the projector according to the invention have been described, it is to be understood that the invention is in no way limited to those embodiments. The constituents of the light source apparatus and the projector may be substituted with different ones that are capable of performing the same function, and desired constituents may be optionally added.

Further, the light source apparatus, the driving method of discharge lamp and the projector according to the invention may include a combination of any two or more configurations (features) of the foregoing embodiments.

Although the magnitude (amplitude) of the alternating current in the AC supply section is set to be constant in the foregoing embodiments, the amplitude of the alternating current may gradually vary, in other words may gradually increase or decrease.

WORKING EXAMPLE

A specific working example of the invention will be described here below.

Working Example 1

A light source apparatus configured as FIG. 1 was built, with the following materials and settings.

Material of discharge lamp main portion: Quartz glass
Enclosure in discharge lamp main portion: Argon, mercury, bromine, methyl bromide
Working pressure in discharge lamp main portion: 200 atm
Material of electrodes: Tungsten
Clearance between electrodes: 1.1 mm
Rated power of discharge lamp: 200 W
AC frequency: 5 kHz
AC value (average including off time): 3 A
B/A: 50%

Comparative Example 1

A light source apparatus generally the same as the working example 1 was built, except that an alternating current of a rectangular waveform (square AC) having a frequency of 150 Hz and a duty ratio of 50%, was employed as the driving current.

Comparative Example 2

A light source apparatus generally the same as the working example 1 was built, except that an alternating current of a rectangular waveform (square AC) having a frequency of 5 kHz and a duty ratio of 50%, was employed as the driving current.

Evaluation

The working example 1, the comparative example 1, and the comparative example 2 were evaluated as follows. The results are shown in Table 1 below.

Projection

Fluctuation of the clearance between the electrodes was observed before turning on and after 500 hours of operation.

The observation results are shown in Table 1. In Table 1, "GOOD" means that the clearance between the electrodes has not changed at all (projections have effectively grown); "FAIR" means that the fluctuation of clearance between the electrodes was not more than 10%; and "POOR" means that the projections have not properly grown to an extent that allows the light source apparatus to be reasonably used (growth of the projections were imperfect).

Anti-Blackening Property

The examples were turned off after 500 hours of operation, and the heated state of the lamps was observed.

The observation results are shown in Table 1. In Table 1, "GOOD" means that no blackening, or blackening of a negligible level has been observed, and "POOR" means that remarkable blackening has been observed.

TABLE 1

|  | B/A (%) | ANTI-BLACKENING PROPERTY | GAP BETWEEN ELECTRODES |
|---|---|---|---|
| WORKING EXAMPLE 1 | 50 | GOOD | GOOD |
| COMPARATIVE EXAMPLE 1 | N/A | POOR | FAIR |
| COMPARATIVE EXAMPLE 2 | N/A | GOOD | POOR |

As is apparent from Table 1 above, in the working example 1 the projections were effectively formed on the tip portion of the electrodes, and excellent result was obtained regarding the blackening. In addition, similar results were obtained from the settings as shown in FIGS. 5 to 7.

In contrast, the comparative example 1 showed remarkable blackening, and in the comparative example 2 the projections were not formed and the electrodes have worn out.

What is claimed is:

1. A light source apparatus comprising:
   a discharge lamp including a pair of electrodes; and
   a driving unit that supplies a driving current to the pair of electrodes,
   wherein the driving unit includes an AC supplier that supplies an alternating current to the pair of electrodes and a DC supplier that supplies a direct current to the pair of electrodes,
   the AC supplier is configured so as to alternately repeat an AC supply section in which the alternating current is supplied and an AC stop section in which the supply of the alternating current is stopped,
   the DC supplier is configured so as to supply the direct current during a period corresponding to the AC stop section,
   the period corresponding to the AC stop section is not lower than 10 µsec and not higher than 100 msec, and
   a frequency of the alternating current is higher than 1 kHz and not higher than 10 GHz.

2. The light source apparatus according to claim 1, wherein the period corresponding to the AC supply section is not lower than 1 msec and not higher than 100 msec.

3. The light source apparatus according to claim 1, wherein a direction of the direct current is changed at least once while the direct current is supplied to the light source apparatus.

4. The light source apparatus according to claim 1, wherein the direct current is supplied during an entire period corresponding to the AC stop section.

5. The light source apparatus according to claim 1, wherein the AC stop section includes a period in which the supply of the direct current is also stopped.

6. The light source apparatus according to claim 1, wherein a magnitude of the direct current is maintained constant while the direct current is supplied.

7. The light source apparatus according to claim 1, wherein an average magnitude of the alternating current in the AC supply section is the same as a magnitude of the direct current supplied in the period corresponding to the AC stop section.

8. The light source apparatus according to claim 1, wherein a magnitude of the alternating current is maintained constant in the AC supply section.

9. The light source apparatus according to claim 1, wherein a magnitude of the alternating current is set to gradually vary in the AC supply section.

10. The light source apparatus according to claim 1, wherein the frequency of the alternating current is higher than 1 kHz and not higher than 100 kHz, or not lower than 3 MHz and not higher than 10 GHz.

11. A projector comprising:
    a light source apparatus that emits a light;
    a modulation unit that modulates the light emitted from the light source apparatus on a basis of an image data; and
    a projecting unit that projects the light modulated by the modulation unit,
    wherein the light source apparatus includes:
    a discharge lamp including a pair of electrodes, and
    a driving unit that supplies a driving current to the pair of electrodes,
    the driving unit includes an AC supplier that supplies an alternating current to the pair of electrodes and a DC supplier that supplies a direct current to the pair of electrodes,
    the AC supplier is configured so as to alternately repeat an AC supply section in which the alternating current is supplied and an AC stop section in which the supply of the alternating current is stopped,
    the DC supplier is configured so as to supply the direct current during a period corresponding to the AC stop section,
    the period corresponding to the AC stop section is not lower than 10 µsec and not higher than 100 msec, and
    a frequency of the alternating current is higher than 1 kHz and not higher than 10 GHz.

12. A light source apparatus comprising:
    a discharge lamp including a pair of electrodes; and
    a driving unit that supplies a driving current to the pair of electrodes,
    wherein the driving unit includes an AC supplier that supplies an alternating current to the pair of electrodes and a DC supplier that supplies a direct current to the pair of electrodes,
    the AC supplier is configured so as to alternately repeat an AC supply section in which the alternating current is supplied and an AC stop section in which the supply of the alternating current is stopped,
    the DC supplier is configured so as to supply the direct current during a period corresponding to the AC stop section,
    a frequency of the alternating current is higher than 1 kHz and not higher than 10 GHz, and
    a ratio B/A is not lower than 50% and not higher than 99%, where A represents a total of the periods corresponding to the AC supply section and the AC stop section, and B represents the period corresponding to the AC supply section.

13. The light source apparatus to claim 12, wherein the period corresponding to the AC supply section is not lower than 1 msec and not higher than 100 msec.

14. The light source apparatus according to claim 12, wherein the direct current is supplied during an entire period corresponding to the AC stop section.

15. The light source apparatus according to claim 12, wherein the AC stop section includes a period in which the supply of the direct current is also stopped.

16. The light source apparatus according to claim 12, wherein a magnitude of the direct current is maintained constant while the direct current is supplied.

17. The light source apparatus according to claim 12, wherein a magnitude of the alternating current is maintained constant in the AC supply section.

18. The light source apparatus according to claim 12, wherein a magnitude of the alternating current is set to gradually vary in the AC supply section.

19. The light source apparatus according to claim 12, wherein the frequency of the alternating current is higher than 1 kHz and not higher than 100 kHz, or not lower than 3 MHz and not higher than 10 GHz.

20. A projector comprising:
    a light source apparatus that emits a light;
    a modulation unit that modulates the light emitted from the light source apparatus on a basis of an image data; and a projecting unit that projects the light modulated by the modulation unit, wherein the light source apparatus includes:
a discharge lamp including a pair of electrodes, and
a driving unit that supplies a driving current to the pair of electrodes,
the driving unit includes an AC supplier that supplies an alternating current to the pair of electrodes and a DC supplier that supplies a direct current to the pair of electrodes,
the AC supplier is configured so as to alternately repeat an AC supply section in which the alternating current is supplied and an AC stop section in which the supply of the alternating current is stopped,
the DC supplier is configured so as to supply the direct current during a period corresponding to the AC stop section,
a frequency of the alternating current is higher than 1 kHz and not higher than 10 GHz, and
a ratio B/A is not lower than 50% and not higher than 99%, where A represents a total of the periods corresponding to the AC supply section and the AC stop section, and B represents the period corresponding to the AC supply section.

21. A light source apparatus comprising:
a discharge lamp including a pair of electrodes; and
a driving unit that supplies a driving current to the pair of electrodes,
wherein the driving unit includes an AC supplier that supplies an alternating current to the pair of electrodes and a DC supplier that supplies a direct current to the pair of electrodes,
the AC supplier is configured so as to alternately repeat an AC supply section in which the alternating current is supplied and an AC stop section in which the supply of the alternating current is stopped,
the DC supplier is configured so as to supply the direct current during a period corresponding to the AC stop section,
a frequency of the alternating current is higher than 1 kHz and not higher than 10 GHz, and
a projection is formed on a tip portion of each of the pair of electrodes while the discharge lamp is turned on because of a fluctuation of a temperature of the pair of electrodes.

22. The light source apparatus to claim 21,
wherein the period corresponding to the AC supply section is not lower than 1 msec and not higher than 100 msec.

23. The light source apparatus according to claim 21,
wherein the direct current is supplied during an entire period corresponding to the AC stop section.

24. The light source apparatus according to claim 21,
wherein the AC stop section includes a period in which the supply of the direct current is also stopped.

25. The light source apparatus according to claim 21,
wherein a magnitude of the direct current is maintained constant while the direct current is supplied.

26. The light source apparatus according to claim 21,
wherein a magnitude of the alternating current is maintained constant in the AC supply section.

27. The light source apparatus according to claim 21,
wherein a magnitude of the alternating current is set to gradually vary in the AC supply section.

28. The light source apparatus according to claim 21,
wherein the frequency of the alternating current is higher than 1 kHz and not higher than 100 kHz, or not lower than 3 MHz and not higher than 10 GHz.

29. A projector comprising:
a light source apparatus that emits a light;
a modulation unit that modulates the light emitted from the light source apparatus on a basis of an image data; and
a projecting unit that projects the light modulated by the modulation unit,
wherein the light source apparatus includes:
a discharge lamp including a pair of electrodes, and
a driving unit that supplies a driving current to the pair of electrodes,
the driving unit includes an AC supplier that supplies an alternating current to the pair of electrodes and a DC supplier that supplies a direct current to the pair of electrodes,
the AC supplier is configured so as to alternately repeat an AC supply section in which the alternating current is supplied and an AC stop section in which the supply of the alternating current is stopped,
the DC supplier is configured so as to supply the direct current during a period corresponding to the AC stop section,
a frequency of the alternating current is higher than 1 kHz and not higher than 10 GHz, and
a projection is formed on a tip portion of each of the pair of electrodes while the discharge lamp is turned on because of a fluctuation of a temperature of the pair of electrodes.

* * * * *